US011756523B2

(12) United States Patent
Tachi

(10) Patent No.: US 11,756,523 B2
(45) Date of Patent: Sep. 12, 2023

(54) ACTIVE NOISE CONTROL SYSTEM

(71) Applicant: Alps Alpine Co., LTD, Tokyo (JP)

(72) Inventor: Ryosuke Tachi, Fukushima (JP)

(73) Assignee: Alps Alpine Co., LTD, Tokyo (JP)

( * ) Notice: Subject to any disclaimer, the term of this patent is extended or adjusted under 35 U.S.C. 154(b) by 52 days.

(21) Appl. No.: 17/689,327

(22) Filed: Mar. 8, 2022

(65) Prior Publication Data

US 2022/0293080 A1 Sep. 15, 2022

(30) Foreign Application Priority Data

Mar. 10, 2021 (JP) ................................ 2021-038390

(51) Int. Cl.

| | |
|---|---|
| ***H04B 1/00*** | (2006.01) |
| ***G10K 11/178*** | (2006.01) |
| ***G10L 21/0208*** | (2013.01) |
| ***G10L 25/84*** | (2013.01) |
| ***H04R 1/40*** | (2006.01) |
| ***H04R 3/00*** | (2006.01) |
| *G10K 11/16* | (2006.01) |

(52) U.S. Cl.

CPC .. *G10K 11/17817* (2018.01); *G10K 11/17854* (2018.01); *G10K 11/17857* (2018.01); *G10L 21/0208* (2013.01); *G10L 25/84* (2013.01); *H04R 1/406* (2013.01); *H04R 3/005* (2013.01); *G10L 2021/02082* (2013.01); *H04R 2499/13* (2013.01)

(58) Field of Classification Search

CPC ....... G10K 11/17817; G10K 11/17854; G10K 11/17857; H04R 1/406; H04R 3/005; H04R 2499/13; G10L 2021/02082

USPC .................................................. 381/86, 71.4

See application file for complete search history.

(56) References Cited

U.S. PATENT DOCUMENTS

| | | | | |
|---|---|---|---|---|
| 2002/0071573 | A1 | 6/2002 | Finn | |
| 2016/0174010 | A1 | 6/2016 | Mohammad et al. | |
| 2021/0006900 | A1 * | 1/2021 | Ohashi ............ | G10K 11/17854 |

FOREIGN PATENT DOCUMENTS

| | | |
|---|---|---|
| JP | 2010-016564 | 1/2010 |
| JP | 2010-163054 | 7/2010 |
| JP | 2018-072770 | 5/2018 |

OTHER PUBLICATIONS

Extended European Search Report dated Jul. 15, 2022 in corresponding European Patent Application No. 22159729.7.

* cited by examiner

*Primary Examiner* — Ammar T Hamid

(74) *Attorney, Agent, or Firm* — Crowell & Moring, L.L.P.

(57) ABSTRACT

In some implementations, an output of a first channel of an echo cancellation variable filter having an output of a first microphone output from a second speaker as an input is added to an output of a second microphone. An echo cancellation coefficient updating unit updates the filter coefficient of the first channel so that the error that is the output of a second adder is minimized. Using the output of the second channel that uses the output of a sound source device output from the first speaker as an input and shares the filter coefficient with the first channel as a reference signal, and the output of the second microphone as an error, the noise cancellation coefficient updating unit updates the filter coefficient of the noise cancellation variable filter that generates a noise-canceling sound to be output from the output of the sound source device to the second speaker.

14 Claims, 6 Drawing Sheets

ACTIVE NOISE CONTROL SYSTEM

RELATED APPLICATION

The present application claims priority to Japanese Patent Application Number 2021-038390, filed Mar. 10, 2021 the entirety of which is hereby incorporated by reference.

BACKGROUND

1. Field of the Disclosure

The present disclosure relates to an active noise control (ANC) technology that reduces noise by emitting noise-canceling sound to cancel out noise.

2. Description of the Related Art

As a technique of active noise control, as in an active noise control system illustrated in FIG. 5A, an active noise control system includes an adaptive filter 53 that generates a noise-canceling sound. The noise-canceling sound is emitted from a speaker 54 in a second area using a sound such as music that is output from a sound source device 51 for the user in a first area to a speaker 52 for the user in the first area that is noise for the user in a second area (for example, JP 2010-163054 A).

In this active noise control system, an error microphone 55 disposed in the second area and a secondary path reproduction filter 56 are used, in which a transfer function C^(z), estimated as a transfer function C(z) from the speaker 54 to the error microphone 55 in the second area, is set as a transfer function and the output of the sound source device 51 is used as an input. In the adaptive filter 53, a coefficient updating unit 532 updates the filter coefficient of a variable filter 531 that generates the noise-canceling sound from the output of the sound source device 51 so as to minimize the error by a Filtered-X LMS algorithm that performs the LMS algorithm using the output of the error microphone 55 as an error and the output of the secondary path reproduction filter 56 as a reference signal.

In addition, in such an active noise control system, in order to correct a difference between the error microphone 55 and the position of the ear of the user in the second area, as illustrated in FIG. 5B, there is also known an active noise control system in which an auxiliary filter 57 having the output of the sound source device 51 as an input is provided, and the error output from the error microphone 55 is corrected by subtracting the output of the auxiliary filter 57 (for example, JP 2018-72770 A).

Here, in this active noise control system, a transfer function H(z), H(z)=P(z)−S(z)V(z)/Sv(z), is set in advance in the auxiliary filter 57.

Here, P(z) is a transfer function from the speaker 52 for the user in the first area to the error microphone 55, V(z) is a transfer function from the speaker 52 for the user in the first area to the position of the ear of the user in the second area, and Sv(z) is a transfer function from the speaker 54 for the user in the second area to the position of the ear of the user in the second area. S(z) is S(z)=C(z) and is a transfer function from speaker 54 for the user in the second area to the error microphone 55.

In addition, as illustrated in FIG. 6, there is also known an echo cancellation system in which a cancellation sound for canceling an echo is generated using an adaptive filter 65, and an adder 66 adds the cancellation sound to an output of a microphone 64 in a second area to cancel an echo going around from a speaker 63 in the second area into the microphone 64 in the second area in a system that supports conversation between a user in the first area and a user in the second area by outputting a user's voice picked up by a microphone 61 in the first area from the speaker 63 in the second area and outputting a user's voice picked up by the microphone 64 in the second area from a speaker 62 in the first area (for example, JP 2010-16564 A).

In the echo cancellation system, in the adaptive filter 65, a coefficient updater 652 updates the filter coefficient of a variable filter 651 that generates a cancellation sound from the output of the microphone 61 in the first area such that the error is minimized by the LMS algorithm or the like using the output of the adder 66 as an error and the output of the microphone 61 in the first area as a reference signal.

SUMMARY

According to the active noise control system illustrated in FIGS. *5a* and *5b*, if the actual transfer function C(z) from the speaker 54 in the second area that outputs the noise-canceling sound to the error microphone 55 changes from the transfer function C^(z) set in the secondary path reproduction filter 56 due to a change in environment or other conditions, the noise cannot be canceled satisfactorily.

Therefore, an object of the present disclosure is to perform satisfactory noise cancellation adapted to a change in a transfer function from a speaker that outputs a noise-canceling sound that cancels noise to a microphone that detects noise remaining after cancellation.

To address the above objective, the present disclosure provides an active noise control system for reducing noise. In some implementations, an active noise control system includes: a first area microphone that is a microphone disposed in a first area; a second area speaker that is a speaker disposed in a second area; a second area microphone that is a microphone disposed in the second area; an echo cancellation adaptive filter configured to receive an output of the first area microphone as an input; an echo cancellation adder configured to add an output of the second area microphone and an output of the echo cancellation adaptive filter; a secondary path reproduction filter configured to receive a noise signal representing noise as an input and to share a filter coefficient with the echo cancellation adaptive filter; a noise cancellation adaptive filter configured to receive the noise signal as an input; and a noise cancellation adder configured to add the output of the first area microphone and the output of the noise cancellation adaptive filter and to output a resulting sum to the second area speaker. The echo cancellation adaptive filter is configured to update a filter coefficient such that an output of the echo cancellation adder is regarded as an error and the error is minimized, and the noise cancellation adaptive filter is configured to update the filter coefficient by a Filtered-X LMS algorithm in which the output of the second area microphone is regarded as an error and an output of the secondary path reproduction filter is regarded as a reference signal.

To address the above objective, the present disclosure provides another form of an active noise control system for reducing noise. In some implementations, an active noise control system includes: a first area microphone that is a microphone disposed in a first area; a second area speaker that is a speaker disposed in the second area; a second area microphone that is a microphone disposed in the second area; an echo cancellation adaptive filter configured to receive an output of the first area microphone as an input; an echo cancellation adder configured to add an output of the second area microphone and an output of the echo cancellation adaptive filter; a secondary path reproduction filter configured to receive a noise signal representing noise as an input and has a variable filter coefficient; a noise cancellation adaptive filter configured to receive the noise signal as an input; a noise cancellation adder configured to add an output of the first area microphone and an output of the noise cancellation adaptive filter and to output a resulting sum to the second area speaker; and a secondary path reproduction filter updating unit configured to update a filter coefficient of the secondary path reproduction filter. The echo cancellation adaptive filter is configured to update the filter coefficient such that an output of the echo cancellation adder is regarded as an error and the error is minimized, and the secondary path reproduction filter updating unit is configured to update the filter coefficient of the secondary path reproduction filter at a predetermined timing so that the filter coefficient becomes equal to the filter coefficient of the echo cancellation adaptive filter. The noise cancellation adaptive filter is configured to update the filter coefficient by a Filtered-X LMS algorithm in which an output of the second area microphone is regarded as an error and an output of the secondary path reproduction filter is regarded as a reference signal.

In implementations of an active noise control systems, by using the fact that the filter coefficient of the echo cancellation adaptive filter converges to the filter coefficient representing the transfer function from the second area speaker to the second area microphone, the filter coefficient of the secondary path reproduction filter that generates the reference signal used for the Filtered-X LMS algorithm in the noise cancellation adaptive filter can follow the change in the transfer function from the second area speaker to the second area microphone. As a result, it is possible to satisfactorily cancel noise adaptive to the change.

These active noise control systems may be provided with an auxiliary filter configured to receive the noise signal as an input; an error correction adder configured to correct the output of the second area microphone used as an error by the noise cancellation adaptive filter by adding an output of the auxiliary filter; and an auxiliary filter updating unit. The auxiliary filter includes: a first filter configured to receive the noise signal as an input and has a transfer function of P(z), P(z) being a transfer function from a noise source to the second area microphone; a second filter configured to receive the noise signal as an input and has a transfer function of V(z)/Sv(z), V(z) being a transfer function from the noise source to a sound listening position of the user in the second area, and Sv(z) being a transfer function from the second speaker to a sound listening position of the user in the second area; a third filter configured to receive an output of the second filter as an input and has a variable filter coefficient; and an adder configured to subtract an output of the first filter from an output of the third filter to generate an output of the auxiliary filter. The auxiliary filter updating unit is configured to update the filter coefficient of the third filter at a predetermined timing so that the filter coefficient becomes equal to the filter coefficient of the echo cancellation adaptive filter.

By configuring an active noise control system in this manner, it is possible to correct a difference between the second area microphone and the sound listening position of the user in the second area, and it is possible to cause the transfer function of the auxiliary filter used for the correction to follow the change in the transfer function from the second area speaker to the second area microphone.

In addition, in some implementations of the active noise control systems, the echo cancellation adaptive filter updates the filter coefficient by an LMS algorithm in which the output of the first area microphone is a reference signal and an output of the echo cancellation adder is an error.

In addition, some implementations of the active noise control system described above may include a first area speaker that is a speaker disposed in the first area to which an output of the echo cancellation adder is input, and may assist listening of the user in the second area, of a speech of the user in the second area.

Alternatively, in some implementations, the active noise control system may include: a sound source device; and a first area speaker that is a speaker disposed in the first area to which an output of the sound source device is input, and the noise signal is an output of the sound source device.

Alternatively, in some implementations, the active noise control system may include: a first area speaker that is a speaker disposed in the first area; a sound source device; and a sound source device adder that adds an output of the sound source device to the output of the echo cancellation adder and outputs the addition result to the first area speaker, and the noise signal is the output of the sound source device.

The above active noise control system may be mounted on an automobile, and the first area and the second area may be different areas in a cabin of the automobile.

As described above, according to forms of the present disclosure, it is possible to perform satisfactory noise cancellation adapted to a change in a transfer function from a speaker that outputs a noise-canceling sound that cancels noise to a microphone that detects noise remaining after cancellation.

DETAILED DESCRIPTION

Hereinafter, an example in which an embodiment of the present disclosure is applied to an in-vehicle system mounted in an automobile will be described as an example.

Figure 1A:
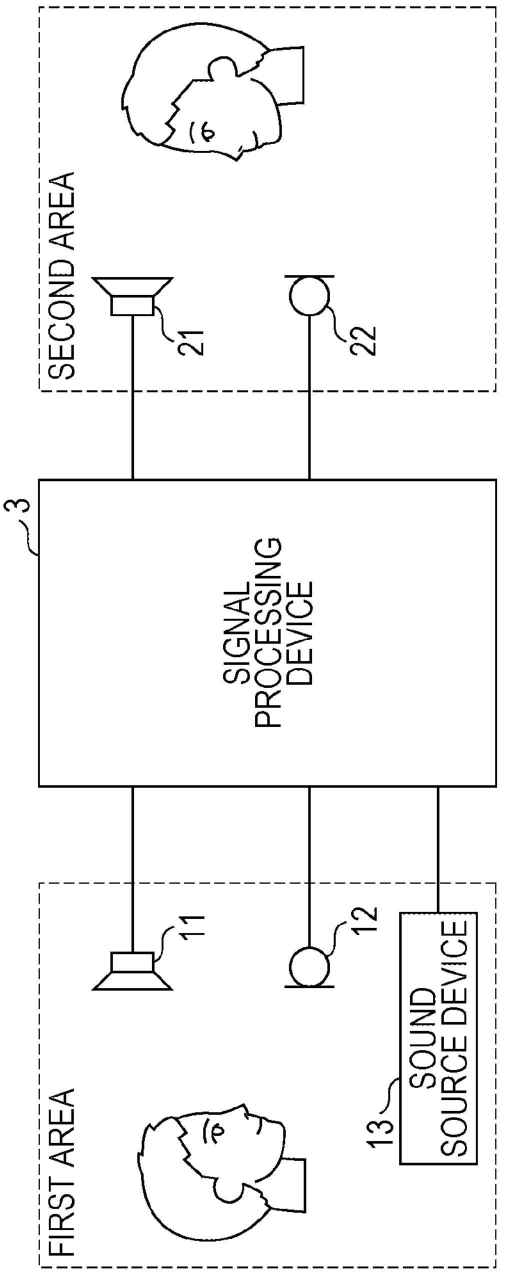
FIGS. 1A and 1B are block diagrams illustrating a configuration of an in-vehicle system according to an embodiment of the present disclosure.
Figure 1B:
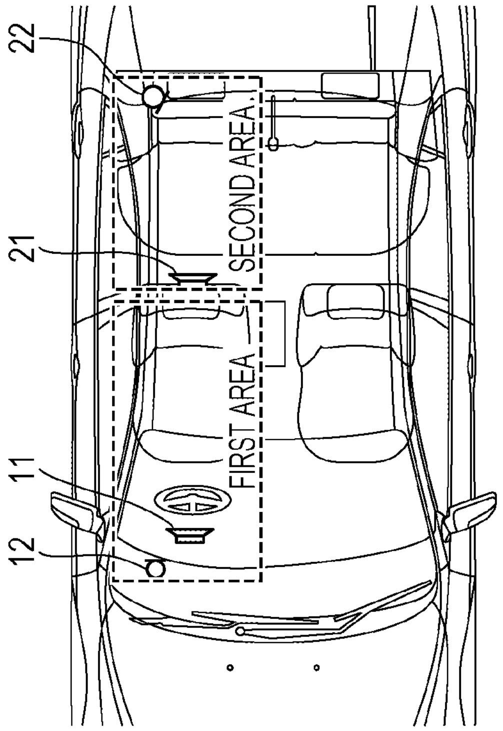

FIGS. 1A and 1B illustrate a configuration of an in-vehicle system according to the first embodiment.

As illustrated in the drawing, an in-vehicle system includes a signal processing device 3 to which the following units are connected: a first speaker 11 that is a speaker for the user in a first area in a cabin; a first microphone 12 that is a microphone for the user in the first area; a sound source device 13 for the user in the first area; a second speaker 21 that is a speaker for the user in a second area in the cabin; and a second microphone 22 that is a microphone for the user in the second area.

The signal processing device 3 supports the communication by conversation between the user in the first area and the user in the second area by outputting the voice of the user in the first area picked up by the first microphone 12 in the first area to the second speaker 21 in the second area, and outputting the voice of the user in the second area picked up by the second microphone 22 in the second area to the first speaker 11 in the first area after canceling an echo of the voice of the user in the first area going around from the second speaker 21 into the second microphone 22.

In addition, the signal processing device 3 prevents the user in the second area from being bothered by the output sound of the sound source device 13 that the user in the first area is listening to by outputting the output sound of the sound source device 13 to the first speaker 11 in the first area, and outputting, from the second speaker 21 in the second area, a noise-canceling sound that cancels the output sound of the sound source device 13 output from the first speaker 11 at the position of the user in the second area.

For example, as illustrated in FIG. 1B, the first area is an area of a driver's seat of an automobile, and the first speaker 11 and the first microphone 12 are disposed in the first area. The second area is an area of a seat behind the driver's seat of an automobile, and the second speaker 21 and the second microphone 22 are disposed in the second area.

Figure 2:
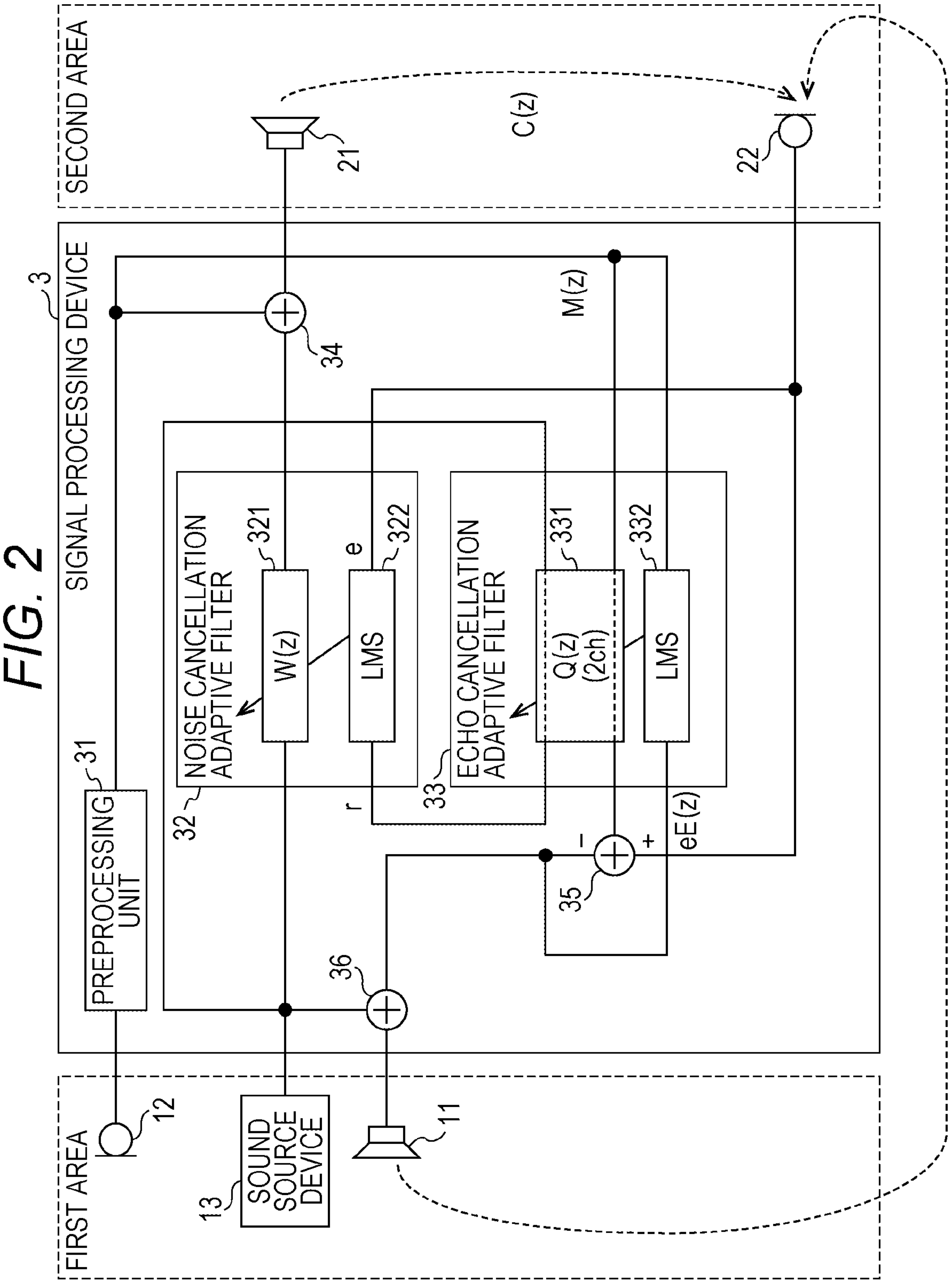
FIG. 2 is a block diagram illustrating a configuration of a signal processing device according to a first embodiment of the present disclosure.

Next, FIG. 2 illustrates a configuration of the signal processing device 3.

As illustrated, the signal processing device 3 includes a preprocessing unit 31, a noise cancellation adaptive filter 32, an echo cancellation adaptive filter 33, a first adder 34, a second adder 35, and a third adder 36.

The output of the first microphone 12 is subjected to preprocessing for performing noise suppression and amplitude suppression so as not to cause excessive input in the preprocessing unit 31, and then sent to the first adder 34, and added to the noise-canceling sound output from the noise cancellation adaptive filter 32 in the first adder 34, and output from the second speaker 21.

The output of the second microphone 22 is sent to the second adder 35, the echo-canceling sound output from the echo cancellation adaptive filter 33 is subtracted by the second adder 35 and then sent to the third adder 36, and the output is added to the output of the sound source device 13 by the third adder 36 and then output to the first speaker 11.

The echo cancellation adaptive filter 33 includes an echo cancellation variable filter 331 and an echo cancellation coefficient updating unit 332. The echo cancellation variable filter 331 is a two-channel variable filter including two signal processing systems, and the same filter coefficient is set to each channel by the echo cancellation coefficient updating unit 332. That is, the echo cancellation variable filter 331 is equivalent to two variable filters in which the same filter coefficient is set by the echo cancellation coefficient updating unit 332.

The first channel of the echo cancellation variable filter 331 receives the output of the first microphone 12 preprocessed by the preprocessing unit 31 as an input, and the output of the first channel is output to the second adder 35 as an echo-canceling sound. In addition, the second channel of the echo cancellation variable filter 331 receives the output of the sound source device 13 as an input, and the output of the second channel is sent to the noise cancellation adaptive filter 32 as a reference signal.

The echo cancellation coefficient updating unit 332 updates the filter coefficient of the first channel of the echo cancellation variable filter 331 so that the error is minimized by the LMS algorithm or the like using the output of the second adder 35 as an error and the output of the first microphone 12 preprocessed by the preprocessing unit 31 as a reference signal. In addition, the filter coefficient of the first channel is shared as the filter coefficient of the second channel, and as the filter coefficient of the first channel is updated, the filter coefficient of the second channel is also updated to be equal to the filter coefficient of the first channel.

As a result, the echo-canceling sound output from the first channel of the echo cancellation variable filter 331 becomes a sound in which the output sound component of the first microphone 12 included in the output of the second microphone 22 is canceled by the subtraction of the second adder 35.

Here, assuming that C(z) is a transfer function of a secondary path that is a path from the second speaker 21 to the second microphone 22, Q(z) is a transfer function of the first channel and the second channel of the echo cancellation variable filter 331, and M(z) is the output of the first microphone 12 preprocessed by the preprocessing unit 31, an error eE(z) output from the second adder 35 to the echo cancellation coefficient updating unit 332 is represented as $eE(z)=M(z)\ C(z)-M(z)\ Q(z)$. Thus, when the filter coefficients of the first channel and the second channel of the echo cancellation variable filter converge so that $eE(z)=0$ by the operation of the echo cancellation coefficient updating unit 332, the error eE(z) is represented as follows.

$$eE(z)=M(z)C(z)-M(z)Q(z)=0$$

$$Q(z)=C(z)$$

Next, the noise cancellation adaptive filter 32 includes a noise cancellation variable filter 321 and a noise cancellation coefficient updating unit 322.

The noise cancellation variable filter 321 receives the output of the sound source device 13 as an input, and the output thereof is output to the first adder 34 as a noise-canceling sound.

The output of the second microphone 22 is input to the noise cancellation coefficient updating unit 322 as an error, and the output of the second channel of the echo cancellation variable filter 331 is input as a reference signal.

Here, as described above, by the operation of the echo cancellation coefficient updating unit 332, the filter coefficient of the second channel of the echo cancellation variable filter 331 is controlled to a filter coefficient that satisfies $Q(z)=C(z)$.

Therefore, the reference signal output from the second channel of the echo cancellation variable filter 331 to the noise cancellation coefficient updating unit 322 is a signal obtained by convolving the transfer function C(z) from the second speaker 21 to the second microphone 22 with the output of the sound source device 13, and this reference signal can be used as a reference signal (filtering reference signal) of the Filtered-X LMS algorithm. That is, the second channel of the echo cancellation variable filter 331 functions as a secondary path reproduction filter in which the transfer function $\hat{C}(z)$ used in the Filtered-X LMS algorithm is set.

Therefore, the echo cancellation coefficient updating unit 332 updates the filter coefficient of the noise cancellation variable filter 321 according to the Filtered-X LMS algorithm by performing the LMS algorithm so as to minimize the error using the output of the second channel of the echo cancellation variable filter 331 as the reference signal.

More specifically, the echo cancellation coefficient updating unit 332 updates the filter coefficient w(n) of the noise cancellation variable filter 321 according to the following equation of the Filtered-X LMS algorithm, $w(n+1)=w(n)+\mu e(n)\ r(n)$, where w(n) is the filter coefficient of the noise cancellation variable filter 321, μ is the step size parameter, e(n) is the output of the second microphone 22, x(n) is the output of the sound source device 13, and r(n) is the reference signal output from the second channel of the echo cancellation variable filter 331.

As a result, the noise-canceling sound output by the noise cancellation variable filter 321 and output from the second speaker 21 through the first adder 34 is a sound that cancels the output sound of the sound source device 13 output from the first speaker 11 in the first area in the region where the second microphone 22 in the second area is disposed.

Figure 5A:
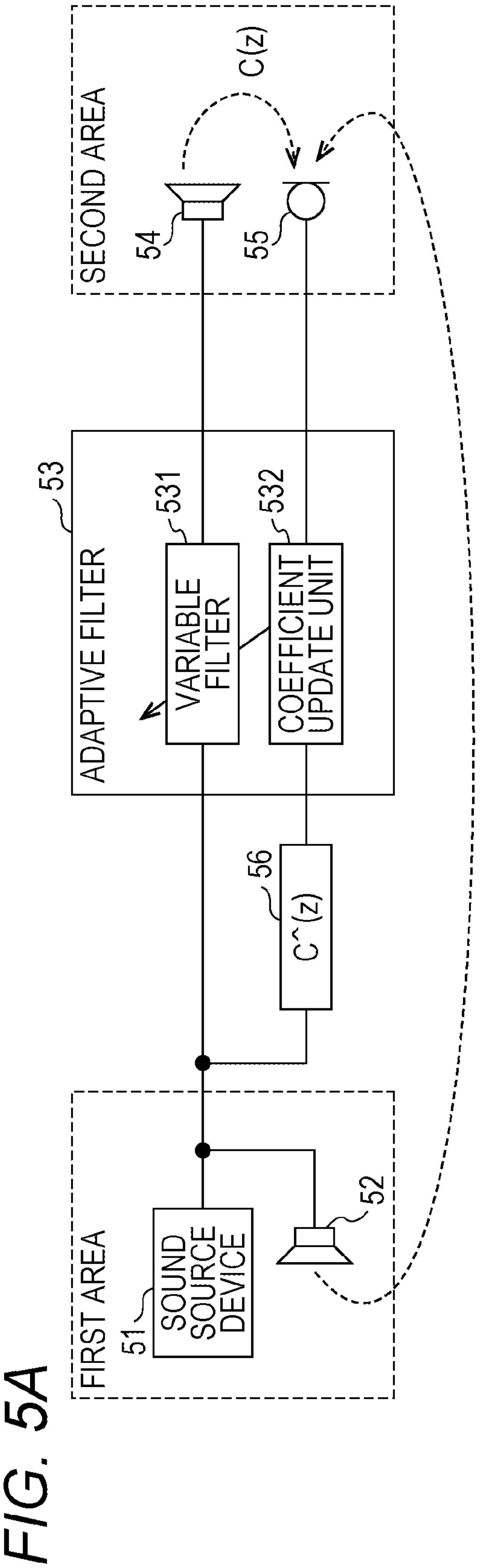
FIGS. 5A and 5B are diagrams illustrating a configuration of a known active noise control system.

In addition, since the transfer function Q(z)=C(z) of the second channel of the echo cancellation variable filter 331 is updated so as to follow the change in the transfer function C(z) from the second speaker 21 to the second microphone 22 by the operation of the echo cancellation coefficient updating unit 332, even when a change in the transfer function C(z) occurs, it is possible to satisfactorily cancel the output sound of the sound source device 13 following the change, unlike the case of using the secondary path reproduction filter 56 in which the transfer function $C\hat{}(z)$ is fixedly set as illustrated in FIG. 5A.

Next, a second embodiment of the present disclosure will be described.

The second embodiment is different from the first embodiment only in a part of the configuration of the signal processing device 3.

Figure 3:
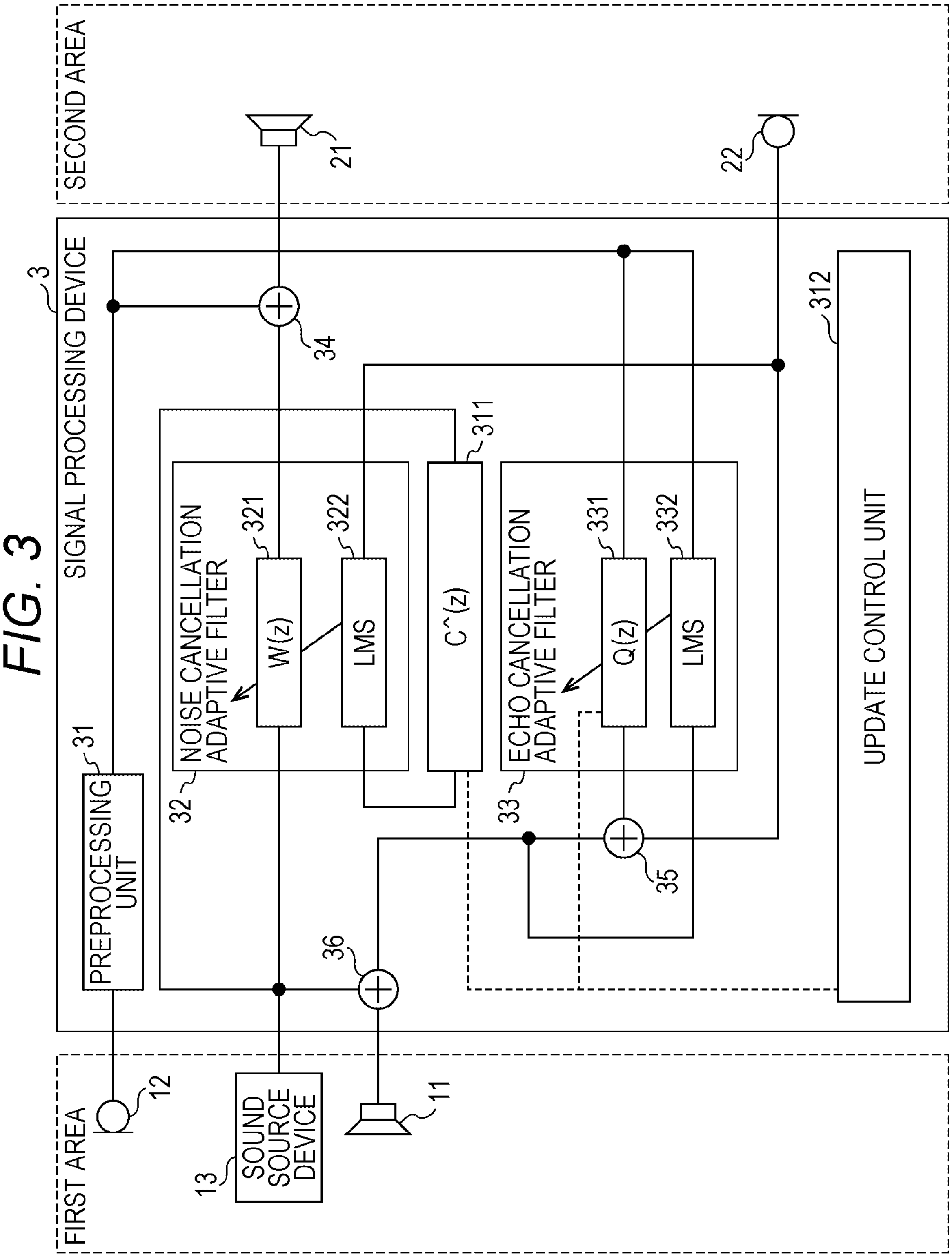
FIG. 3 is a block diagram illustrating a configuration of a signal processing device according to a second embodiment of the present disclosure.

FIG. 3 illustrates a configuration of the signal processing device 3 according to the second embodiment.

As illustrated, the signal processing device 3 according to the second embodiment is different from that of the first embodiment in that the echo cancellation variable filter 331 is a variable filter having a single channel corresponding to the first channel of the echo cancellation variable filter 331 of the first embodiment, the secondary path reproduction filter 311 is provided as a substitute for the second channel of the echo cancellation variable filter 331 of the first embodiment, and an update control unit 312 that sets a filter coefficient of the secondary path reproduction filter 311 is provided.

Similar to the second channel of the echo cancellation variable filter 331 of the first embodiment, the secondary path reproduction filter 311 receives the output of the sound source device 13 as an input, and the output thereof is sent to the noise cancellation adaptive filter 32 as a reference signal.

The update control unit 312 periodically reads the filter coefficient of the echo cancellation variable filter 331, obtains an average of the filter coefficients of the echo cancellation variable filter 331 during a past predetermined period, and when a difference of a predetermined level or more occurs between the average and the previously set filter coefficient of the secondary path reproduction filter 311, smoothly changes the filter coefficient of the secondary path reproduction filter 311 up to the calculated average of the filter coefficients.

As a result of such an operation, the transfer function $C\hat{}(z)$ of the secondary path reproduction filter 311 follows the transfer function Q(z)=C(z) of the echo cancellation variable filter 331 controlled by the operation of the echo cancellation coefficient updating unit 332, similarly to the second channel of the echo cancellation variable filter 331 of the first embodiment. Thus, according to the second embodiment as well, it is possible to satisfactorily cancel the output sound of the sound source device 13 adapted to the change in the transfer function C(z) from the second speaker 21 to the second microphone 22.

Next, a third embodiment will be described.

Figure 4:
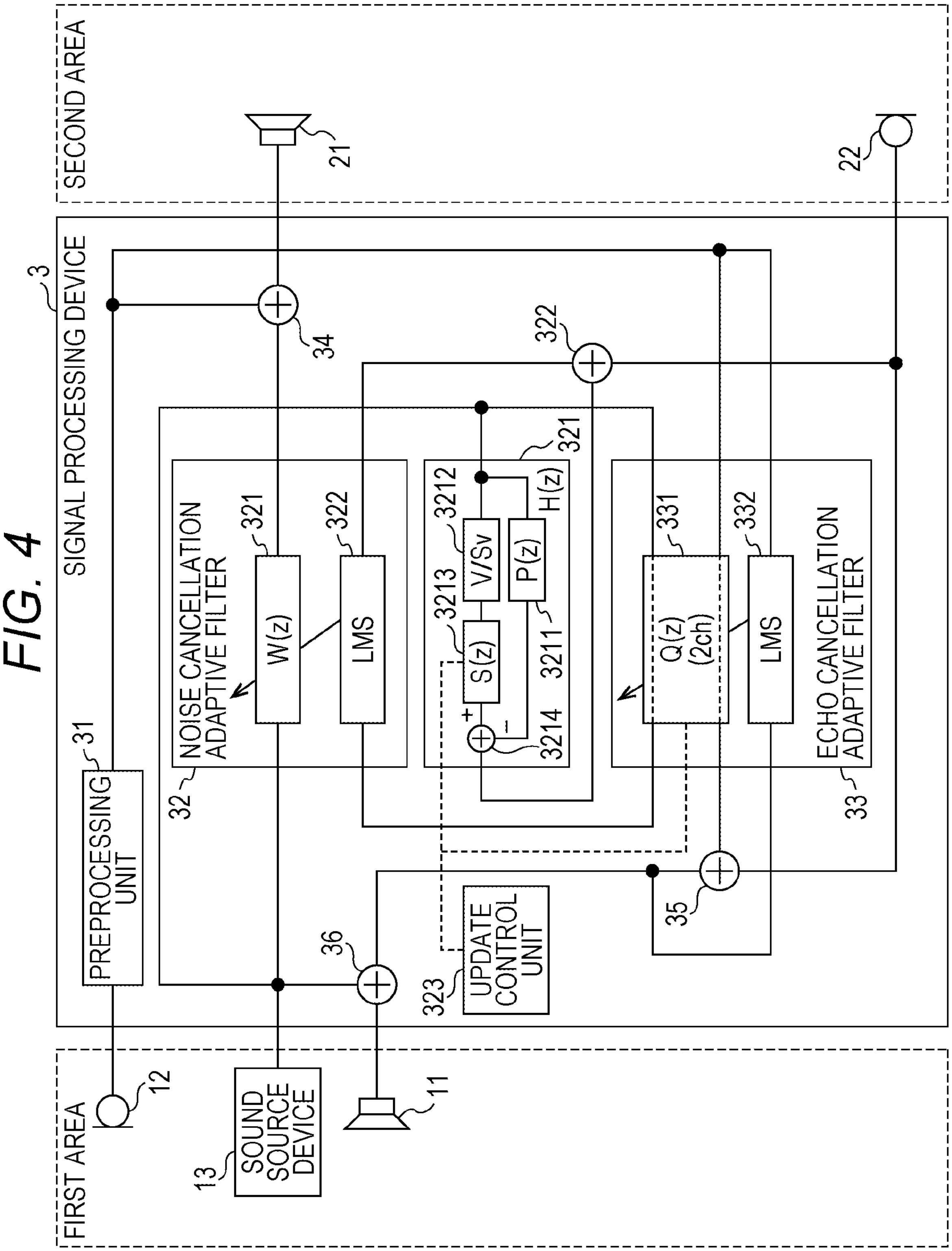
FIG. 4 is a block diagram illustrating a configuration of a signal processing device according to a third embodiment of the present disclosure.

FIG. 4 illustrates a configuration of a signal processing device 3 according to the second embodiment.

As illustrated in the drawing, the signal processing device 3 according to the third embodiment is different from that of the first embodiment in that an auxiliary filter 321, a fourth adder 322, and an update processing unit 323 are provided.

The auxiliary filter 321 is provided to correct the difference between the second microphone 22 and the position of the user's ear in the second area, and the fourth adder 322 outputs a signal obtained by adding the output of the auxiliary filter 321 to the output of the second microphone 22 to the noise cancellation coefficient updating unit 322. Then, the noise cancellation coefficient updating unit 322 updates the filter coefficient of the noise cancellation variable filter 321 according to the Filtered-X LMS algorithm by performing the LMS algorithm so as to minimize the error using the output of the fourth adder 322 as an error and the output of the second channel of the echo cancellation variable filter 331 as a reference signal.

Figure 5B:
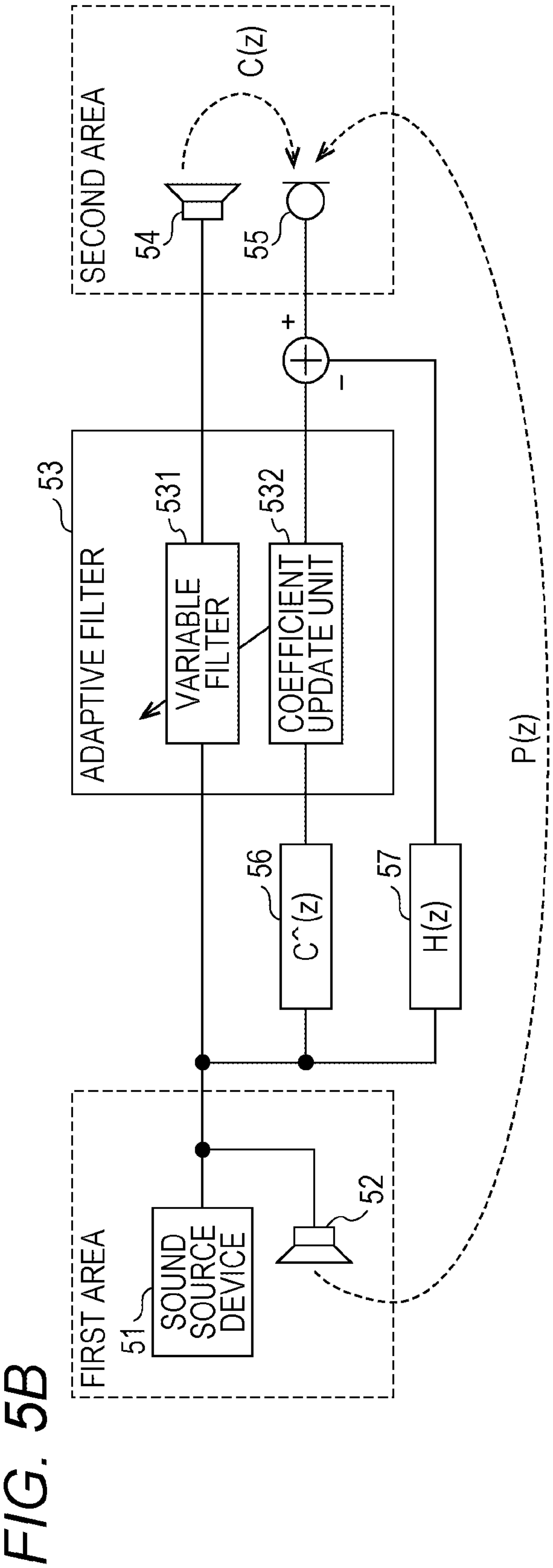
Figure 6:
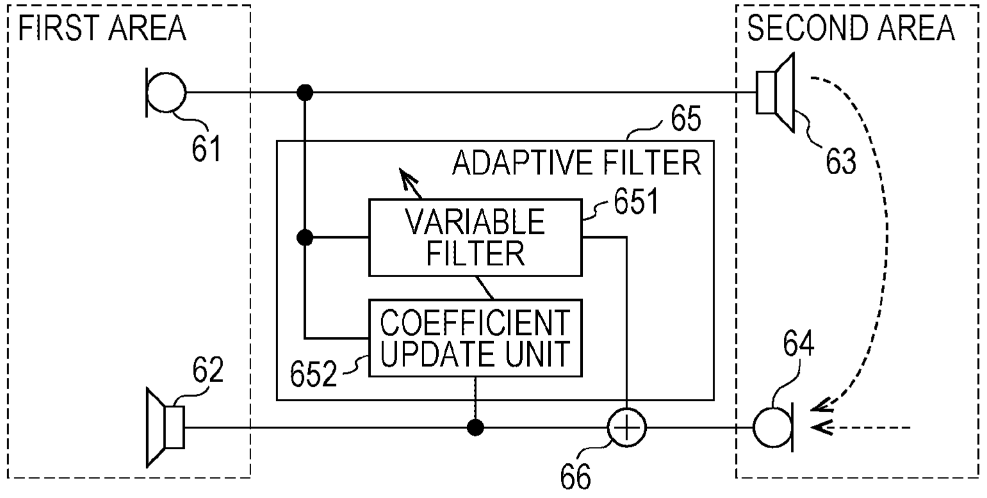
FIG. 6 is a diagram illustrating a configuration of a known echo cancellation system.

The transfer function H(z) of the auxiliary filter 321 is represented as $H(z)=S(z)\ V(z)/Sv(z)-P(z)$ which is obtained by inverting the positive/negative signs of the transfer function of the auxiliary filter 57 of the active noise control system illustrated in FIG. 5B since addition is performed instead of subtraction in FIG. 5B by the fourth adder 322.

P(z) is a transfer function from the first speaker 11 to the second microphone 22, S(z) is a transfer function from the second speaker 54 to the second microphone 22, V(z) is a transfer function from the first speaker 11 to the position of the user's ear in the second area, and Sv(z) is a transfer function from the second speaker 54 to the position of the user's ear in the second area. Therefore, S(z)=C(z).

The auxiliary filter 321 includes a first filter 3211 having a transfer function of P(z), a second filter 3212 having a transfer function of V(z)/Sv(z), a third filter 3213 having a transfer function of S(z), and a fifth adder 3214, and the filter coefficient of the third filter 3213 can be set from the update processing unit 323.

The output of the sound source device 13 is input to the first filter 3211 and the second filter 3212, the output of the first filter 3211 is sent to the fifth adder 3214, the output of the second filter 3212 is input to the third filter 3213, and the output of the third filter 3213 is sent to the fifth adder 3214.

Then, the fifth adder 3214 subtracts the output of the first filter 3211 from the output of the third filter 3213 and transmits the subtraction result to the fourth adder 322 as the output of the auxiliary filter 321.

The update processing unit 323 periodically reads the filter coefficient of any channel of the echo cancellation variable filter 331, obtains an average of the filter coefficients read during a past predetermined period, and when a difference of a predetermined level or more occurs between the average and the previously set filter coefficient of the third filter 3213, smoothly changes the filter coefficient of the third filter 3213 up to the calculated average of the filter coefficients.

As a result of such an operation, the transfer function S(z) of the third filter 3213, which should originally be S(z)=C(z) can follow the transfer function Q(z)=C(z) of each channel of the echo cancellation variable filter 331 controlled by the operation of the echo cancellation coefficient updating unit 332, and the output sound of the sound source device 13 can be satisfactorily cancelled so as to be adapted to the change in the transfer function C(z) from the second speaker 21 to the second microphone 22.

Here, the configuration including the auxiliary filter 321 and updating the filter coefficient of the third filter 3213 illustrated in the third embodiment may be similarly added to the signal processing device 3 according to the second embodiment illustrated in FIG. 3.

In each of the above embodiments, the configuration of canceling the echo going around from the second speaker 21 of the signal processing device 3 into the second microphone 22 and the configuration of being symmetric with respect to the first area and the second area may be added to the signal processing device 3, so that the voice picked up by the first microphone 12 in the first area may be output to the second speaker 21 after canceling the echo going around from the first speaker 11 into the first microphone 12.

Furthermore, a second sound source device for the user in the second area may be provided, and the configuration of the signal processing device 3 in which the output sound of the sound source device 13 of the signal processing device 3 described above is output to the first speaker 11, and the noise-canceling sound for canceling the output sound of the sound source device 13 output from the first speaker 11 at the position of the user in the second area is output from the second speaker 21 and the configuration being symmetric with respect to the first area and the second area may be added to the signal processing device 3, so that the output sound of the second sound source device is output to the second speaker 21 and the noise-canceling sound for canceling the output sound of the sound source device 13 output from the second speaker 21 at the position of the user in the first area is output from the first speaker 11.

In each of the above embodiments, the number of areas is two, but the present embodiment may be expanded to correspond to three or more areas.

Furthermore, although the application to the in-vehicle system has been described above as an example, each of the above embodiments can be similarly applied to a case where the areas are outside the automobile.

While exemplary embodiments and implementations have been illustrated and described, it will be understood by those skilled in the art that various changes and modifications may be made, and equivalents may be substituted for elements thereof without departing from the true scope of the disclosure. In addition, many modifications may be made to adapt a particular situation to the teachings of the disclosure without departing from the central scope thereof. Therefore, it is intended that this disclosure not be limited to the particular embodiments disclosed, but that the disclosure will include all embodiments falling within the scope of the appended claims.

What is claimed is:

1. An active noise control system for reducing noise, the active noise control system comprising:

- a first area microphone that is a microphone disposed in a first area;
- a second area speaker that is a speaker disposed in a second area;
- a second area microphone that is a microphone disposed in the second area;
- an echo cancellation adaptive filter configured to receive an output of the first area microphone as an input;
- an echo cancellation adder configured to add an output of the second area microphone and an output of the echo cancellation adaptive filter;
- a secondary path reproduction filter configured to receive a noise signal representing noise and to share a filter coefficient with the echo cancellation adaptive filter;
- a noise cancellation adaptive filter configured to receive the noise signal as an input; and
- a noise cancellation adder configured to add the output of the first area microphone and an output of the noise cancellation adaptive filter and to output a resulting sum to the second area speaker;
- wherein the echo cancellation adaptive filter is configured to update a filter coefficient such that an output of the echo cancellation adder is regarded as an error and the error is minimized; and
- wherein the noise cancellation adaptive filter is configured to update the filter coefficient by a Filtered-X LMS algorithm in which the output of the second area microphone is regarded as an error and an output of the secondary path reproduction filter is regarded as a reference signal.

2. The active noise control system according to claim 1, further comprising:

- an auxiliary filter configured to receive the noise signal as an input;
- an error correction adder configured to correct the output of the second area microphone used as an error by the noise cancellation adaptive filter by adding an output of the auxiliary filter; and
- an auxiliary filter updating unit, wherein the auxiliary filter includes:
  - a first filter configured to receive the noise signal as an input, the first filter having a transfer function of P(z), where P(z) is a transfer function from the noise source to the second area microphone;
  - a second filter configured to receive the noise signal as an input, the second filter having a transfer function of V(z)/Sv(z), where V(z) is a transfer function from a noise source to a sound listening position of the user in the second area, and Sv(z) is a transfer function from a second speaker to a sound listening position of the user in the second area;
  - a third filter configured to receive an output of the second filter as an input, the third filter having a variable filter coefficient; and
  - an adder configured to subtract an output of the first filter from an output of the third filter to generate an output of the auxiliary filter, and
  - wherein the auxiliary filter updating unit is configured to update the filter coefficient of the third filter at a predetermined timing so that the filter coefficient becomes equal to the filter coefficient of the echo cancellation adaptive filter.

3. The active noise control system according to claim 2, wherein:

- the echo cancellation adaptive filter is configured to update the filter coefficient by an LMS algorithm in which an output of the first area microphone is regarded as a reference signal and an output of the echo cancellation adder is regarded as an error.

4. The active noise control system according to claim 3, further comprising:

- a first area speaker that is a speaker disposed in the first area to which an output of the echo cancellation adder is input.

5. The active noise control system according to claim 3, further comprising:
a sound source device; and
a first area speaker that is a speaker disposed in the first area to which an output of the sound source device is input;
wherein the noise signal is an output of the sound source device.

6. The active noise control system according to claim 3, further comprising:
a first area speaker that is a speaker disposed in the first area;
a sound source device; and
a sound source device adder configured to add an output of the sound source device to the output of the echo cancellation adder and to output a resulting sum to the first area speaker;
wherein the noise signal is the output of the sound source device.

7. The active noise control system according to claim 6, wherein:
the active noise control system is mounted in an automobile; and
the first area and the second area are different areas in a cabin of the automobile.

8. An active noise control system for reducing noise, the active noise control system comprising:
a first area microphone that is a microphone disposed in a first area;
a second area speaker that is a speaker disposed in the second area;
a second area microphone that is a microphone disposed in the second area;
an echo cancellation adaptive filter configured to receive an output of the first area microphone as an input;
an echo cancellation adder configured to add an output of the second area microphone and an output of the echo cancellation adaptive filter;
a secondary path reproduction filter configured to receive a noise signal representing noise as an input, the secondary path reproduction having a variable filter coefficient;
a noise cancellation adaptive filter configured to receive the noise signal as an input;
a noise cancellation adder configured to add an output of the first area microphone and an output of the noise cancellation adaptive filter and to output a resulting sum to the second area speaker; and
a secondary path reproduction filter updating unit configured to update a filter coefficient of the secondary path reproduction filter;
wherein the echo cancellation adaptive filter is configured to update the filter coefficient such that an output of the echo cancellation adder is regarded as an error and the error is minimized; and
wherein the secondary path reproduction filter updating unit is configured to update the filter coefficient of the secondary path reproduction filter at a predetermined timing so that the filter coefficient becomes equal to the filter coefficient of the echo cancellation adaptive filter, and
wherein the noise cancellation adaptive filter is configured to update the filter coefficient by a Filtered-X LMS algorithm in which an output of the second area microphone is regarded as an error and an output of the secondary path reproduction filter is regarded as a reference signal.

9. The active noise control system according to claim 8, further comprising:
an auxiliary filter configured to receive the noise signal as an input;
an error correction adder configured to correct the output of the second area microphone used as an error by the noise cancellation adaptive filter by adding an output of the auxiliary filter; and
an auxiliary filter updating unit, including:
a first filter configured to receive the noise signal as an input, the first filter having a transfer function of P(z), where P(z) is a transfer function from a noise source to the second area microphone;
a second filter configured to receive the noise signal as an input, the second filter having a transfer function of V(z)/Sv(z), where V(z) is a transfer function from the noise source to a sound listening position of a user in the second area, and Sv(z) is a transfer function from the second speaker to a sound listening position of the user in the second area;
a third filter configured to receive an output of the second filter as an input, where the third filter has a variable filter coefficient; and
an adder configured to subtract an output of the first filter from an output of the third filter to generate an output of the auxiliary filter;
wherein the auxiliary filter updating unit is configured to update the filter coefficient of the third filter at a predetermined timing so that the filter coefficient becomes equal to the filter coefficient of the echo cancellation adaptive filter.

10. The active noise control system according to claim 9, wherein:
the echo cancellation adaptive filter is configured to update the filter coefficient by an LMS algorithm in which the output of the first area microphone is a reference signal and an output of the echo cancellation adder is an error.

11. The active noise control system according to claim 10, further comprising:
a first area speaker that is a speaker disposed in the first area to which an output of the echo cancellation adder is input.

12. The active noise control system according to claim 10, further comprising:
a sound source device; and
a first area speaker that is a speaker disposed in the first area to which an output of the sound source device is input;
wherein the noise signal is an output of the sound source device.

13. The active noise control system according to claim 10, further comprising:
a first area speaker that is a speaker disposed in the first area;
a sound source device; and
a sound source device configured to add an output of the sound source device to the output of the echo cancellation adder and to output an addition result to the first area speaker;
wherein the noise signal is the output of the sound source device.

14. The active noise control system according to claim 13, the active noise control system being mounted in an automobile, wherein the first area and the second area are different areas in a cabin of the automobile.

* * * * *